US012131704B2

(12) United States Patent
Kim et al.

(10) Patent No.: US 12,131,704 B2
(45) Date of Patent: Oct. 29, 2024

(54) PRECHARGE CIRCUIT AND SOURCE DRIVER INCLUDING THE SAME

(71) Applicant: LX Semicon Co., Ltd., Daejeon (KR)

(72) Inventors: Young Bok Kim, Daejeon (KR); Won Kim, Daejeon (KR); Taiming Piao, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/643,042

(22) Filed: Dec. 7, 2021

(65) Prior Publication Data

US 2022/0189411 A1 Jun. 16, 2022

(30) Foreign Application Priority Data

Dec. 10, 2020 (KR) ........................ 10-2020-0172530

(51) Int. Cl.

*G09G 3/3266* (2016.01)
*G09G 3/3208* (2016.01)
*G09G 3/3275* (2016.01)

(52) U.S. Cl.

CPC ... *G09G 3/3266* (2013.01); *G09G 2310/0251* (2013.01); *G09G 2310/08* (2013.01); *G09G 2320/043* (2013.01)

(58) Field of Classification Search

None

See application file for complete search history.

(56) References Cited

U.S. PATENT DOCUMENTS

2003/0214470 A1* 11/2003 Sun ...................... G09G 3/3688 345/87
2005/0151714 A1* 7/2005 Hirama ................ G09G 3/3688 345/100
2006/0044237 A1* 3/2006 Lee ..................... G09G 3/3233 345/82
2007/0176868 A1* 8/2007 Lee ..................... G02F 1/13306 345/87
2008/0170052 A1* 7/2008 Ryu ..................... G09G 3/3688 345/204
2009/0213049 A1* 8/2009 McCreary ............ G09G 3/3233 345/80
2010/0164926 A1* 7/2010 Huang ................. G09G 3/3685 345/211
2011/0007067 A1* 1/2011 Ryu ..................... G09G 3/3233 345/76

(Continued)

FOREIGN PATENT DOCUMENTS

KR 2010-0075054 A 7/2010
KR 2012-0047538 A 5/2012

(Continued)

*Primary Examiner* — Sepehr Azari

(74) *Attorney, Agent, or Firm* — POLSINELLI PC

(57) ABSTRACT

The present disclosure discloses a precharge circuit capable of compensating for a resistance deviation between channels so that sense lines of a display panel can be uniformly charged and a source driver including the same. The precharge circuit may include a voltage terminal configured to provide a reference voltage, a common line connected to the voltage terminal, and channel lines connected to the common line and configured to transfer, to respective sense lines of a display panel, the reference voltage transferred through the common line.

15 Claims, 4 Drawing Sheets

(56) References Cited

U.S. PATENT DOCUMENTS

| | | | | |
|---|---|---|---|---|
| 2012/0086694 | A1* | 4/2012 | Tseng | G09G 3/3233 345/212 |
| 2012/0306826 | A1* | 12/2012 | Tsuchi | G09G 3/2011 345/204 |
| 2013/0120344 | A1* | 5/2013 | Liao | G09G 3/3688 345/212 |
| 2014/0022289 | A1* | 1/2014 | Lee | G09G 3/006 345/76 |
| 2015/0325174 | A1* | 11/2015 | Yu | H01L 27/32 345/77 |
| 2016/0012768 | A1* | 1/2016 | In | G09G 3/3225 345/82 |
| 2017/0162105 | A1* | 6/2017 | Kim | H01L 28/20 |
| 2018/0061314 | A1* | 3/2018 | Kim | G09G 3/3233 |
| 2018/0151133 | A1* | 5/2018 | Huang | G09G 3/2092 |
| 2018/0190192 | A1* | 7/2018 | Kwon | G09G 3/3233 |
| 2018/0190196 | A1* | 7/2018 | Kwon | H01L 27/3206 |
| 2018/0254004 | A1* | 9/2018 | Hsiao | G09G 3/20 |
| 2018/0293955 | A1* | 10/2018 | Liu | G09G 5/003 |
| 2019/0074344 | A1* | 3/2019 | Ka | H01L 27/3265 |
| 2020/0184902 | A1* | 6/2020 | Kim | G09G 3/3291 |
| 2021/0287583 | A1* | 9/2021 | Shin | G09G 3/3275 |
| 2022/0122545 | A1* | 4/2022 | Hong | G09G 3/3266 |

FOREIGN PATENT DOCUMENTS

| | | | |
|---|---|---|---|
| KR | 2015-0015646 | A | 2/2015 |
| KR | 2017-0015649 | A | 2/2017 |
| KR | 10-1903019 | B1 | 10/2018 |

* cited by examiner

PRECHARGE CIRCUIT AND SOURCE DRIVER INCLUDING THE SAME

BACKGROUND

1. Technical Field

The present disclosure relates to a display apparatus, and more particularly, to a precharge circuit capable of compensating for a resistance deviation between channels and a source driver including the same.

2. Related Art

In general, a display apparatus includes a display panel, a display driving apparatus, a timing controller, etc.

The display driving apparatus may include a source driver integrated as a chip, and may include a plurality of source drivers by taking into consideration the size and resolution of the display panel.

The source driver may convert, into a source signal, digital image data provided by the timing controller, and may provide the source signal to the display panel.

Furthermore, the source driver needs to sense each of pixels of the display panel in order to compensate for a deterioration characteristic of the pixels.

Sense lines for sensing the pixels may be configured in the display panel. Furthermore, the source driver may charge the sense lines by providing a precharge voltage to the sense lines of the display panel connected to channels, and may sense a deterioration characteristic of the pixels as a voltage change or current change in the sense lines after the charging.

The source driver may convert, into digital data, signals obtained by the sensing, and may provide the digital data to the timing controller.

In general, the source driver may provide the precharge voltage, provided through a common line, to the sense lines through the channels. Therefore, a resistance deviation between the channels may be formed with respect to the precharge voltage. Accordingly, the precharge voltage having another level may be provided to the sense lines of the channels due to the influence of the resistance deviation. As a result, charge voltages of the sense lines have a deviation therebetween.

The deviation between the charge voltages of the sense lines may act as an obstacle in accurately sensing a deterioration characteristic of the pixels.

Accordingly, there is a need for a technology capable of solving a resistance deviation between channels for a precharge voltage of a source driver.

SUMMARY

Various embodiments are directed to providing a precharge circuit capable of compensating for a resistance deviation between channels for a precharge voltage and a source driver including the same.

In an embodiment, a precharge circuit may include a voltage terminal configured to provide a reference voltage, a common line connected to the voltage terminal, channel lines connected to the common line and configured to transfer, to respective sense lines of a display panel, the reference voltage transferred through the common line, and a compensation circuit configured to compensate for a common resistance deviation of the common line between channels with respect to each of the channel lines.

In an embodiment, a source driver may include a precharge circuit configured to precharge sense lines of a display panel. The precharge circuit may include a voltage terminal configured to provide a reference voltage, a common line connected to the voltage terminal, channel lines connected to the common line and configured to transfer, to the respective sense lines of the display panel, the reference voltage transferred through the common line, and a compensation circuit configured to compensate for a common resistance deviation of the common line between channels with respect to each of the channel lines.

The source driver according to embodiments can uniformly charge the sense lines of the display panel in response to a precharge voltage by compensating for a resistance deviation between channels for the precharge voltage.

Furthermore, the source driver can accurately sense a deterioration characteristic of pixels by uniformly charging the sense lines by using a precharge voltage.

Furthermore, the source driver can minimize a characteristic deviation between pixels by accurately sensing a deterioration characteristic of the pixels.

Furthermore, the source driver can solve a problem in that a brightness difference occurs in an image by minimizing a characteristic deviation between pixels.

DETAILED DESCRIPTION

The present disclosure discloses a precharge circuit capable of compensating for a resistance deviation between channels so that the sense lines of a display panel can be uniformly charged using a precharge voltage, and a source driver including the same.

In embodiments, such sense lines may be defined as signal lines for sensing characteristics of pixels of a display panel. Such sense lines may be connected to the channels of a source driver.

In embodiments, it may be understood that the channels of a source driver include channel lines and common lines. The channel lines are connected to the sense lines of a display panel. The common lines transfer a reference voltage to the channel lines.

In embodiments, a display period may be defined as a period in which a source signal corresponding to image data is outputted to a display panel. A sense period may be defined as a period in which a deterioration characteristic of pixels of the display panel is sensed.

Figure 1:
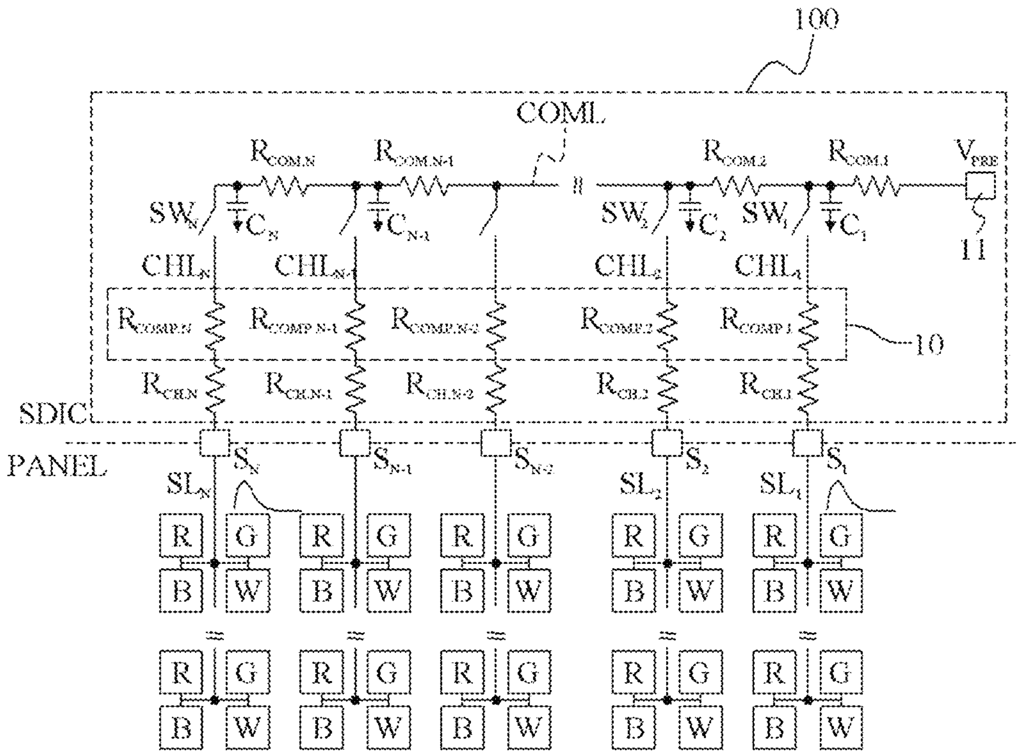
FIG. 1 is a diagram illustrating a precharge circuit and a source driver including the same according to an embodiment.

FIG. 1 is a diagram illustrating a precharge circuit 100 and a source driver SDIC including the same according to an embodiment. FIG. 1 illustrates that a display panel PANEL includes sense lines $SL_1$ to $SL_N$ and pixels R, G, B, and W. It may be understood that the pixel R means a red pixel, the pixel G means a green pixel, the pixel B means a blue pixel, and the pixel W means a white pixel.

For convenience of description, FIG. 1 briefly illustrates that the source driver SDIC represented as an embodiment of the present disclosure includes the precharge circuit 100. However, the source driver SDIC may further include a construction (not illustrated) for providing the display panel PANEL with a source signal corresponding to image data.

The precharge circuit 100 may include a voltage terminal 11, a common line COML, switches $SW_1$ to $SW_N$, channel lines $CHL_1$ to $CHL_N$ and a compensation circuit 10.

The voltage terminal 11 may be connected to the common line COML, and may provide a reference voltage $V_{PRE}$ to the common line COML. It may be understood that the voltage terminal 11 is connected to a voltage source (not illustrated) for generating and providing the reference voltage $V_{PRE}$. Therefore, the voltage terminal 11 may be understood as a reference voltage source for supplying the reference voltage $V_{PRE}$. In an embodiment of the present disclosure, the reference voltage may be understood as a precharge voltage.

The common line COML may be connected to the channel lines $CHL_1$ to $CHL_N$ through the switches $SW_1$ to $SW_N$, and may transfer, to the channel lines $CHL_1$ to $CHL_N$, the reference voltage $V_{PRE}$ provided by the voltage terminal 11.

The channel lines $CHL_1$ to $CHL_N$ may be connected to the sense lines $SL_1$ to $SL_N$ of the display panel PANEL, and may transfer, the sense lines $SL_1$ to $SL_N$ of the display panel, the reference voltage $V_{PRE}$ transferred through the common line COML. Nodes connected to the channel lines $CHL_1$ to $CHL_N$ and the sense lines $SL_1$ to $SL_N$ of the display panel PANEL may be defined as precharge nodes $S_1$ to $S_N$, respectively. Furthermore, it may be understood that the channel lines $CHL_1$ to $CHL_N$ are configured in the common line COML in parallel.

Each of resistance values of the channel lines $CHL_1$ to $CHL_N$ may be set by adjusting the line width or length of each of the channel lines $CHL_1$ to $CHL_N$ made of a conductive material. Each of the channel lines $CHL_1$ to $CHL_N$ may be represented as having a compensation resistor $R_{COMP}$ and a unique resistor $R_{CH}$. The compensation resistors for the respective channels may be indicated as $R_{COMP.1}$, $R_{COMP.2}$ . . . $R_{COMP.N}$, respectively, and may be called a compensation resistor $R_{COMP}$ in common. The unique resistors for the respective channels may be indicated as $R_{CH.1}$, $R_{CH.2}$ . . . $R_{CH.N}$, respectively, and may be called a unique resistor $R_{CH}$ in common. It may be assumed that the unique resistors $R_{CH.1}$, $R_{CH.2}$ . . . $R_{CH.N}$ for the respective channels have the same resistance values.

A resistance value of the common line COML that acts on each of the channel lines $CHL_1$ to $CHL_N$ varies depending on a difference between physical distances in which the reference voltage $V_{PRE}$ is transferred to the respective channel lines $CHL_1$ to $CHL_N$. That is, a resistance deviation may occur between the channel lines $CHL_1$ to $CHL_N$. For example, a resistance value of the common line COML that acts on the channel line $CHL_N$ may be understood as $R_{COM.1}$+ . . . +$R_{COM.N}$ corresponding to a physical distance in which the reference voltage $V_{PRE}$ is transferred. A resistance value of the common line COML that acts on the channel line $CHL_{N-1}$ may be understood as $R_{COM.1}$+ . . . +$R_{COM.N-1}$ corresponding to a physical distance in which the reference voltage $V_{PRE}$ is transferred. In FIG. 1, C1 . . . CN may be understood as equivalent capacitance corresponding to $R_{COM.1}$ . . . $R_{COM.N}$ of the common line COML.

The compensation circuit 10 may be configured to compensate for a resistance deviation of the common line COML with respect to each of the channel lines $CHL_1$ to $CHL_N$. To this end, the compensation circuit 10 may include the compensation resistor $R_{COMP}$ for each channel for compensating for a resistance deviation of the common line COML between the channels.

A resistance value of the compensation resistor $R_{COMP}$ in each of the channels of the compensation circuit 10 may be set to compensate for a resistance deviation according to a location of each of the channel lines $CHL_1$ to $CHL_N$ connected to the common line COML.

That is, a resistance value of the compensation resistor $R_{COMP}$ for each of the channels of the compensation circuit 10 may be set as a value for reversely compensating for the resistance deviation.

For example, the source driver SDIC may extract a resistance value by calculating a time constant τ for each channel.

First, time constants τ1 to τN for the respective channels may be calculated as in <Equation 1>below.

$$\tau_1 = R_{COM1} C_1$$

$$\tau_N = R_{COM.1} C_1 + (R_{COM.1} + R_{COM.2}) C_2 + \ldots + (R_{COM.1} + \ldots + R_{COM.N}) C_N \quad \text{<Equation 1>}$$

Next, the source driver SDIC may extract a resistance value of the compensation resistor $R_{COMP}$ for each channel for reversely compensating for a resistance deviation between the channels so that all the time constants τ1 to τN for the respective channels become equal.

The source driver SDIC may provide a uniform voltage to the sense lines $SL_1$ to $SL_N$ of the display panel PANEL and uniformly charge the precharge nodes $S_1$ to $S_N$ by compensating for a resistance deviation between the channels as described above.

After charging the sense lines $SL_1$ to $SL_N$ with a uniform voltage, the source driver SDIC may sense characteristics of the pixels of the display panel PANEL through a sense circuit (not illustrated).

The sense circuit may be included in the source driver SDIC, and may be connected to the precharge nodes $S_1$ to $S_N$ corresponding to the sense lines $SL_1$ to $SL_N$.

For example, the sense circuit may include an integrated circuit for converting signals of the sense lines $SL_1$ to $SL_N$ into a voltage signal or a sampling circuit for sampling and holding signals of the sense lines $SL_1$ to $SL_N$.

The source driver SDIC may convert, into digital data, signals obtained by the sense circuit, and may provide the digital data to a timing controller.

Figure 2:
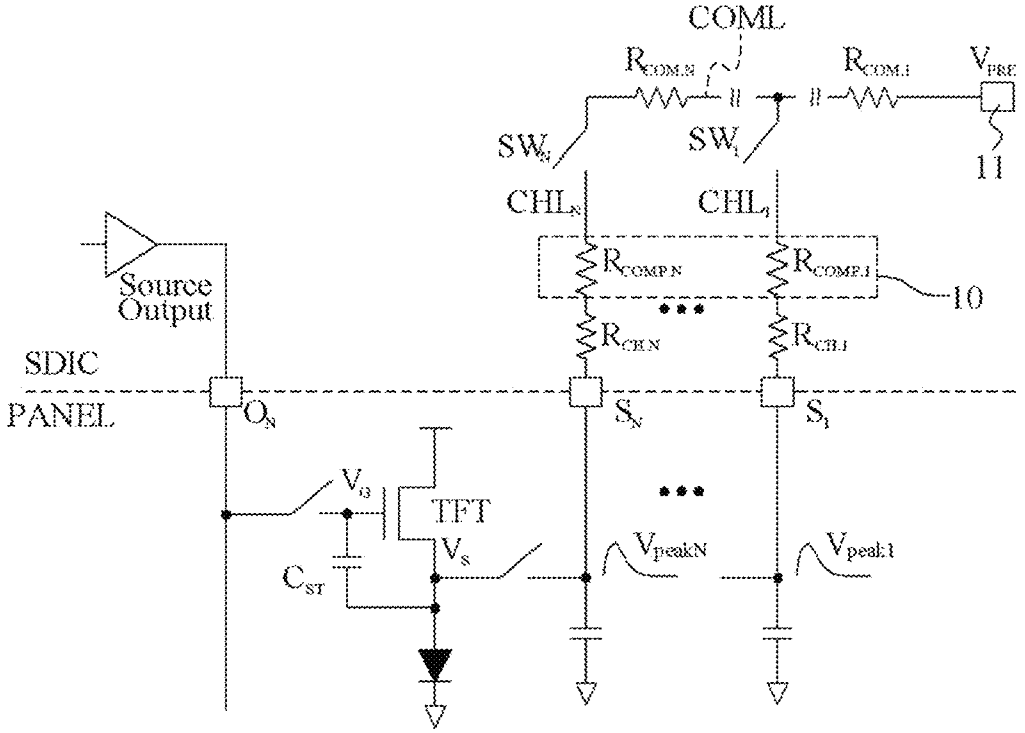
FIG. 2 is a diagram for describing an operation of the precharge circuit and the source driver including the same according to an embodiment.

FIG. 2 is a diagram for describing an operation of the precharge circuit and the source driver including the same according to an embodiment.

Referring to FIG. 2, in the display period, the source driver SDIC may provide the display panel PANEL with a source signal Source Output corresponding to image data. In FIG. 2, $Q_N$ means a source signal input terminal, TFT means a driving transistor, $V_G$ means a gate voltage of the driving transistor TFT, and $C_{ST}$ means a charging capacitor.

Although not specifically illustrated, the source driver SDIC may include a latch circuit for latching image data, a digital-to-analog converter for converting the image data into a source signal by using a corresponding gamma voltage, and a source output circuit for outputting the source signal Source Output to the display panel PANEL.

Furthermore, in the sense period, the source driver SDIC may charge the sense lines $SL_1$ to $SL_N$ by using the reference voltage $V_{PRE}$. In this case, the charging may be understood as precharge.

The source driver SDIC can solve a resistance deviation between the channels of the common line COML by reverse compensation using the compensation circuit 10 included in the channel lines $CHL_1$ to $CHL_N$. The solving of a resistance deviation between the channels may be understood with reference to the description of FIG. 1.

The source driver SDIC can solve a resistance deviation between the channels by reverse compensation using the compensation circuit 10, thereby uniformly charging the precharge nodes $S_1$ to $S_N$ corresponding to the sense lines $SL_1$ to $SL_N$ of the display panel PANEL. In FIG. 2, $V_{peakN}$ and $V_{peak1}$ illustrate settle voltages in the respective sense lines by charging.

Furthermore, after uniformly charging the sense lines $SL_1$ to $SL_N$, the source driver SDIC may sense signals of the sense lines $SL_1$ to $SL_N$, may convert the sense signals into digital data, and may provide the digital data to the timing controller.

Each of the pixels of the display panel PANEL may include an organic light-emitting diode and a driving transistor TFT. The driving transistors TFT and organic light-emitting diodes of the pixels may have different characteristics, such as a threshold voltage and mobility.

Furthermore, the organic light-emitting diode and driving transistor TFT of each of the pixels of the display panel PANEL may deteriorate by lapse of a driving time. Accordingly, a characteristic deviation may occur between the pixels of the display panel PANEL.

If a characteristic deviation occurs between the pixels, currents flowing into the driving transistors TFT of the pixels may be different although the same source signal is applied to the pixels. This may cause a brightness difference occurring in an image.

The source driver SDIC according to an embodiment can accurately sense a characteristic deviation between the pixels because the source driver SDIC uniformly charges the precharge nodes $S_1$ to $S_N$ corresponding to the sense lines $SL_1$ to $SL_N$ of the display panel by compensating for a resistance deviation between the channels.

Accordingly, the source driver SDIC can solve a problem in that a brightness difference occurs in an image because the source driver SDIC can minimize a characteristic deviation between the pixels by accurately sensing a characteristic deviation between the pixels.

Figure 3:
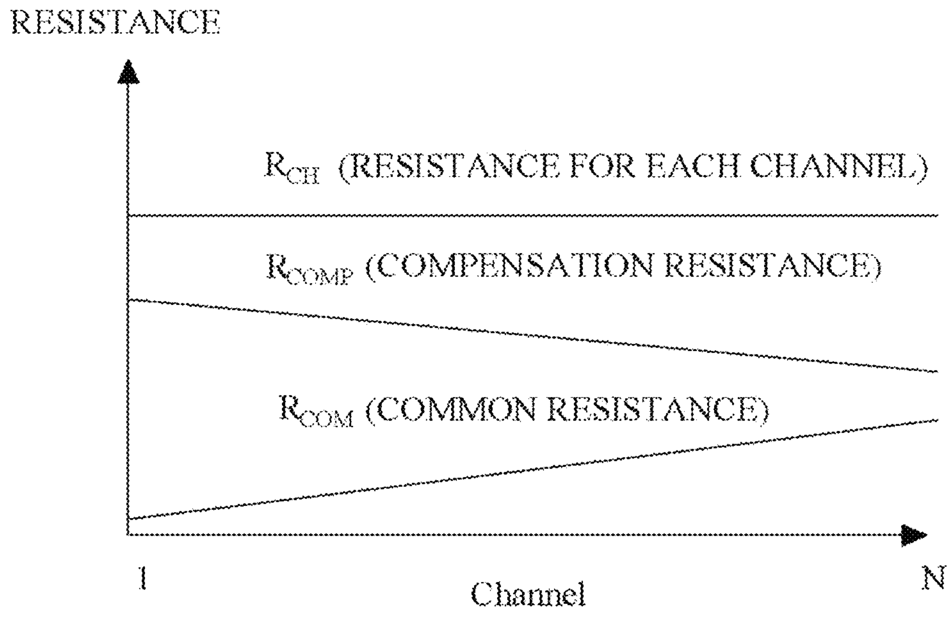
FIG. 3 is a graph illustrating values of compensation resistance for compensating for a resistance deviation between channels.

FIG. 3 is a graph illustrating resistance values of the compensation resistor $R_{COMP}$ for compensating for a resistance deviation of the common resistors $R_{COM}$ between the channels.

Referring to FIG. 3, the compensation circuit 10 may be included in each of the channel lines $CHL_1$ to $CHL_N$. A resistance value of the compensation resistor $R_{COMP}$ of the compensation circuit 10 may be set as a value for compensating for a resistance value of the common resistor $R_{COM}$ in each of the channels of the common line COML of the compensation circuit 10.

For example, a resistance value of the compensation resistor $R_{COMP}$ may be extracted by calculating a time constant for each channel After the time constants τ1 to τN for the respective channels are calculated, a value for reversely compensating for a resistance deviation between the channels may be extracted as a resistance value of the compensation resistor $R_{COMP}$ for each channel in a condition in which all the time constants τ1 to τN for the respective channels become identical with one another.

That is, a resistance value of the compensation resistor $R_{COMP}$ may be set as a value for reversely compensating for a resistance deviation of the common resistor $R_{COM}$ for each channel.

Figure 4:
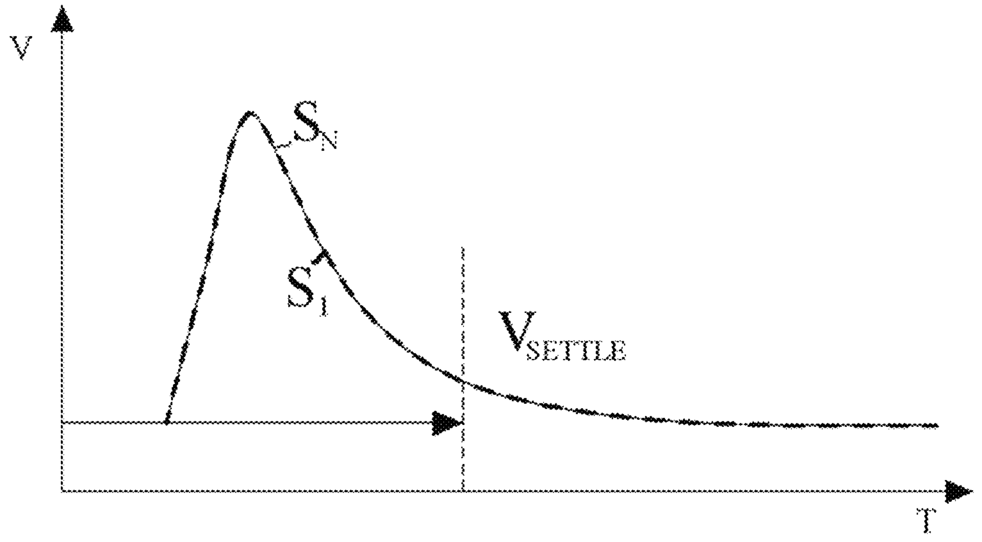
FIG. 4 is a charge voltage waveform diagram of precharge nodes $S_1$ and $S_N$ illustrated in FIG. 1.

FIG. 4 is a voltage waveform diagram of the precharge nodes $S_1$ and $S_N$ illustrated in FIG. 1.

Referring to FIG. 4, the source driver SDIC makes time constants τ from the voltage terminal 11, providing the reference voltage $V_{PRE}$ to the precharge nodes $S_1$ to $S_N$, identical with one another by adding a resistance value of the compensation resistor $R_{COMP}$ to a resistance value of the unique resistor $R_{CH}$ for each channel. That is, voltages $V_{SETTLE}$ settled upon precharge may become uniform by making the time constants τ of all the channels identical with one another.

As described above, the source driver SDIC according to embodiments can uniformly charge the precharge nodes $S_1$ to $S_N$ corresponding to the sense lines $SL_1$ to $SL_N$ of the display panel by compensating for a resistance deviation between the channels.

Furthermore, the source driver SDIC can accurately sense characteristics of the pixels because the source driver SDIC uniformly charges the precharge nodes $S_1$ to $S_N$.

Furthermore, the source driver SDIC can minimize a characteristic deviation between the pixels because the source driver SDIC accurately senses characteristics of the pixels.

Furthermore, the source driver SDIC can solve a problem in that a brightness difference occurs in an image by minimizing a characteristic deviation between the pixels.

What is claimed is:

1. A precharge circuit comprising:

at least one data line configured to provide a data signal to a control input of light emitting elements and display an image based on the data signal, wherein the data signal is provided to the light emitting elements during a display period of a frame;

a voltage terminal configured to provide a reference voltage to sense lines for sensing deterioration of the light emitting elements;

a common line connected to the voltage terminal;

channel lines connected to the common line and configured to transfer, to respective sense lines of a display panel, the reference voltage to precharge the sense lines during a sensing period of the frame, wherein each sense line is coupled to the light emitting elements during the sensing period; and a compensation circuit including a plurality of compensation resistors configured to compensate for a resistance deviation of the common line between the voltage terminal with respect to each of the channel lines, wherein the reference voltage is supplied to the common line, wherein the plurality of compensation resistors are connected to the common line in parallel and compensate the resistance deviation due to a distance difference between a connection point to which the common line and each of the channel lines are connected and the voltage terminal, wherein the compensation circuit charges a plurality of nodes to be equal to a precharge voltage based on the plurality of compensation resistors, and wherein each sense line includes a corresponding node of the plurality of nodes.

2. The precharge circuit of claim 1, wherein a resistance value of a compensation resistor varies depending on the resistance deviation.

3. The precharge circuit of claim 1, wherein a resistance value of a compensation resistor is set as a value for reversely compensating for the resistance deviation.

4. The precharge circuit of claim 3, wherein the resistance value of the compensation resistor is set to satisfy a condition in which all time constants for the respective channels become identical.

5. The precharge circuit of claim 1, wherein each sense line is coupled to a source terminal of the light emitting elements.

6. A source driver comprising:

at least one data line configured to provide a data signal to light emitting elements and display an image based on the data signal, wherein the data signal is provided to the light emitting elements during a display period of a frame;

a precharge circuit configured to precharge sense lines of a display panel, wherein the precharge circuit comprises:

a voltage terminal configured to provide a reference voltage to the sense lines for sensing deterioration of the light emitting elements;

a common line connected to the voltage terminal;

channel lines connected to the common line and configured to transfer, to the respective sense lines of the display panel, the reference voltage to precharge the sense lines during a sensing period of the frame, wherein each sense line is coupled to the light emitting elements during the sensing period; and a compensation circuit including a plurality of compensation resistors configured to compensate for a resistance deviation of the common line between the voltage terminal with respect to each of the channel lines, wherein the reference voltage is supplied to the common line, wherein the plurality of compensation resistors are connected to the common line in parallel and compensate the resistance deviation due to a distance difference between a connection point to which the common line and each of the channel lines are connected and the voltage terminal, wherein the compensation circuit charges a plurality of nodes to be equal to a precharge voltage based on the plurality of compensation resistors, and wherein each sense line includes a corresponding node of the plurality of nodes.

7. The source driver of claim 6, wherein a resistance value of a compensation resistor varies depending on the resistance deviation.

8. The source driver of claim 6, wherein a resistance value of a compensation resistor is set as a value for reversely compensating for the resistance deviation.

9. The source driver of claim 8, wherein the resistance value of the compensation resistor is set to satisfy a condition in which all time constants for the respective channels become identical.

10. The source driver of claim 6, further comprising a sense circuit configured to sense characteristics of pixels of the display panel by sensing signals of the sense lines after charging the sense lines.

11. The source driver of claim 6, wherein each sense line is coupled to a source terminal of the light emitting elements.

12. A display device, comprising:

a display panel including a plurality of light emitting elements and configured to display an image based on a data signal, wherein the data signal is provided a control input of the plurality of light emitting elements during a display period of a frame;

a plurality of data lines connected to the plurality of light emitting elements, a plurality of sense lines connected to a corresponding output of the plurality of light emitting elements to obtain deterioration information associated with an organic material of the plurality of light emitting elements; and a precharge circuit comprising:

a common line connected to the plurality of sense lines;

channel lines connected to the common line and configured to transfer, to respective sense lines, a reference voltage transferred through the common line to precharge the plurality of sense lines to obtain deterioration information, wherein each sense line is coupled to corresponding light emitting elements during a sensing period; and a compensation circuit including a plurality of compensation resistors configured to compensate for a resistance deviation of the common line between a voltage terminal with respect to each of the channel lines, wherein the reference voltage is supplied to the common line, wherein the plurality of compensation resistors are connected to the common line in parallel and compensate the resistance deviation due to a distance difference between a connection point to which the common line and each of the channel lines are connected and the voltage terminal, wherein the compensation circuit charges a plurality of nodes to be equal to a precharge voltage based on the plurality of compensation resistors, and wherein each sense line includes a corresponding node of the plurality of nodes.

13. The precharge circuit of claim 12, wherein a resistance value of a compensation resistor varies depending on the resistance deviation.

14. The precharge circuit of claim 12, wherein a resistance value of a compensation resistor is set as a value for reversely compensating for the resistance deviation.

15. The precharge circuit of claim 14, wherein the resistance value of the compensation resistor is set to satisfy a condition in which all time constants for the respective channels become identical.

* * * * *